(12) United States Patent
Lazzarini et al.

(10) Patent No.: US 11,806,922 B2
(45) Date of Patent: Nov. 7, 2023

(54) CNC MACHINING CENTRE (71) Applicant: C.M.S. S.P.A., Zogno (IT)

(72) Inventors: Ramon Lazzarini, Paladina (IT); Nicola Rinaldi, Bergamo (IT)

(73) Assignee: C.M.S. S.p.A., Zogno (IT)

( * ) Notice: Subject to any disclaimer, the term of this patent is extended or adjusted under 35 U.S.C. 154(b) by 427 days.

(21) Appl. No.: 17/118,714

(22) Filed: Dec. 11, 2020

(65) Prior Publication Data
US 2021/0178544 A1  Jun. 17, 2021

(30) Foreign Application Priority Data
Dec. 13, 2019  (IT) .................. 102019000023982

(51) Int. Cl.
*B23Q 15/14* (2006.01)
*B29C 64/106* (2017.01)
(Continued)

(52) U.S. Cl.
CPC ............ *B29C 64/106* (2017.08); *B22F 10/66* (2021.01); *B22F 12/22* (2021.01); *B22F 12/82* (2021.01); *B23C 1/12* (2013.01); *B23Q 15/14* (2013.01); *B29C 64/232* (2017.08); *B29C 64/236* (2017.08); *B29C 64/241* (2017.08);
(Continued)

(58) Field of Classification Search
CPC ... B29C 64/106; B29C 64/379; B29C 64/232; B29C 64/236; B29C 64/241; B29C 64/188; B33Y 10/00; B33Y 30/00; B33Y 40/00; B33Y 40/20; B22F 10/66; B22F 12/22; B22F 12/82; B22F 2999/00; B23C 1/12;
(Continued)

(56) References Cited

U.S. PATENT DOCUMENTS

2017/0355141 A1* 12/2017 Bettermann .......... B29C 64/106
2018/0194076 A1   6/2018 Bell et al.

FOREIGN PATENT DOCUMENTS

DE       19533960 A1 *  3/1997  ............ B22F 3/1055
EP        1614497 A1     1/2006
(Continued)

OTHER PUBLICATIONS

Celiker et al., DE19533960A1, machine translation German to English, 19970320 (Year: 1997).*

*Primary Examiner* — Joseph S Del Sole
*Assistant Examiner* — Lawrence D. Hohenbrink, Jr.
(74) *Attorney, Agent, or Firm* — LAUBSCHER & LAUBSCHER, P.C.

(57) ABSTRACT

A CNC machining centre is disclosed, with an additive unit that forms an unmachined workpiece by additive production and that comprises an operating member with a rotation axis, and with a subtractive unit that removes material from the unmachined workpiece formed by the additive unit and that comprises a tool-holding spindle with a motorized spindle axis, with a subtractive configuration, in which the spindle axis of the subtractive unit carries a tool for removing material, and with an additive configuration, in which the spindle axis of the subtractive unit is connected to the rotation axis to drive the operating member of the additive unit and in which a prevalent part of the tool-holding spindle is situated next to at least one part of the operating member, where "next to" means in a horizontal direction.

20 Claims, 11 Drawing Sheets (51) Int. Cl.
| | |
|---|---|
| *B33Y 30/00* | (2015.01) |
| *B29C 64/379* | (2017.01) |
| *B29C 64/232* | (2017.01) |
| *B29C 64/236* | (2017.01) |
| *B29C 64/241* | (2017.01) |
| *B33Y 40/20* | (2020.01) |
| *B23C 1/12* | (2006.01) |
| *B22F 12/00* | (2021.01) |
| *B22F 12/82* | (2021.01) |
| *B22F 10/66* | (2021.01) |
| *B29C 64/188* | (2017.01) |
| *B23Q 37/00* | (2006.01) |
| *B23Q 3/12* | (2006.01) |
| *B33Y 40/00* | (2020.01) |
| *B23K 28/02* | (2014.01) |
| *B23P 23/04* | (2006.01) |
| *B33Y 10/00* | (2015.01) |

(52) U.S. Cl.
CPC ............ *B29C 64/379* (2017.08); *B33Y 30/00* (2014.12); *B33Y 40/20* (2020.01); *B22F 2999/00* (2013.01); *B23K 28/02* (2013.01); *B23P 23/04* (2013.01); *B23Q 3/12* (2013.01); *B23Q 37/00* (2013.01); *B29C 64/188* (2017.08); *B33Y 10/00* (2014.12); *B33Y 40/00* (2014.12); *Y02P 10/25* (2015.11)

(58) Field of Classification Search
CPC  B23K 28/02; B23P 23/04; B23Q 3/12; B23Q 37/00; B23Q 15/14; Y02P 10/25
USPC ......................................................... 264/162
See application file for complete search history.

(56) References Cited

FOREIGN PATENT DOCUMENTS

| | | |
|---|---|---|
| EP | 3170620 A1 | 5/2017 |
| GB | 2560737 A | 9/2018 |

* cited by examiner

CNC MACHINING CENTRE

BACKGROUND OF THE INVENTION

The invention relates to a CNC machining centre, in particular a machining centre that is provided with several numerically controlled operating axes and which is suitable for machining unmachined workpieces obtained by an additive process.

In particular, reference is made to a machining centre comprising at least one additive unit and at least one subtractive unit; the additive unit is configured for forming an unmachined workpiece by additive production and the subtractive unit is motorized and is configured for performing removal of material from the workpiece formed by the additive unit; the machining centre may take on a subtractive configuration, in which the subtractive unit does not drive the additive unit and can carry a tool for removing material, and at least one additive configuration, in which the motorized subtractive unit is connected to the additive unit with the possibility of driving the additive unit.

A machining centre of the type disclosed above is already known, that, nevertheless, has the drawback represented by the fact that in the additive configuration, the assembly formed by the additive unit and by the subtractive unit has overall a relatively high overall vertical dimension. This means, in addition to the need to have available a considerable height space where to locate the operating units, also a certain height limitation of the stroke of the vertical operating axis (Z axis) of the numeric control of the machining centre.

SUMMARY OF THE INVENTION

One object of the invention is to make a machining centre that is able to overcome the aforesaid drawback of the prior art.

One object of the invention is to provide an alternative solution to the problem of driving an additive unit by motorization of the subtractive unit in the context of a CNC machining centre.

One advantage is to provide a machining centre that is able to adopt an additive configuration in which the additive unit and the subtractive unit have overall a relatively reduced overall vertical dimension.

One advantage is to permit a relatively high stroke of the vertical linear operating axis (axis Z) of a CNC machining centre in which an additive unit is removably connectable to a subtractive unit, which is in turn connected to the operating axes of the machining centre.

One advantage is to make available a constructionally simple and cheap CNC machining centre.

One advantage is to give rise to a CNC machining centre with an additive unit that is not provided with its own motorization for driving at least one operating member and in which this operating member can be driven by the motorization of a subtractive unit.

Such objects and advantages, and still others, are achieved by a CNC machining centre and/or by a machining method in the context of a CNC machining centre, according to one or more of the claims set out below.

In one embodiment, a CNC machining centre comprises at least one additive unit configured for forming an unmachined workpiece by additive production and at least one subtractive unit configured for removing material from the unmachined workpiece formed by the additive unit, in which the additive unit comprises at least one operating member with a rotation axis, the subtractive unit comprises at least one tool-holding spindle with a motorized spindle axis, at least one subtractive configuration being provided in which the spindle axis of the tool-holding spindle of the subtractive unit is connected to the rotation axis of the operating member of the additive unit and can carry a tool for removing material, and at least one additive configuration, in which the spindle axis is connected to the rotation axis and can drive the operating member of the additive unit and in which a prevalent part of the vertical overall dimensions of the tool-holding spindle is situated next to at least one part of the vertical overall dimensions of the operating member, where "next to" means in a horizontal direction.

BRIEF DESCRIPTION OF THE DRAWINGS

The invention can be better understood and implemented with reference to the attached drawings that illustrate one embodiment by way of non-limiting example, in which.

DETAILED DESCRIPTION

With reference to the aforesaid figures, a CNC machining centre has been with 1 indicated overall, in particular a CNC machining centre that is suitable for machining workpieces by additive production techniques, for example by 3D printing techniques.

The machining centre 1 may comprise, in particular, at least one machining zone 2. The machining zone 2 may comprise, in particular, at least one machining plane, in particular a horizontal plane, configured for supporting at least one workpiece being machined. The machining zone 2 may be provided, in particular, with clamping means for clamping at least one workpiece in a machining position.

The machining centre 1 may comprise, in particular, at least two numerically controlled operating axes, for example two linear operating axes (for example at least one horizontal axis and at least one vertical axis). The machining centre 1 may comprise, in particular, at least one vertical linear axis (axis Z). The machining centre 1 may comprise, in particular, at least three numerically controlled operating axes. The machining centre 1 may comprise, in particular, at least two or three linear axes and at least one or two rotary axes. In particular the machining centre 1 may be, as in the specific embodiment, of the type with five numerically controlled operating axes, in particular with three linear axes (axes X, Y, Z) and two rotary axes.

The machining centre 1 may comprise, in particular, the operating means that is suitable for moving one or more operating units in the machining zone 2, for example controlled by the numerically controlled operating axes. This operating means may comprise, in particular, support arrangement and/or conveying means and/or guide means and/or actuating means and/or sensor means and/or tool storage means etc. This operating means may comprise, in particular, operating means of known type that is usually used in a numeric control machining centre 1. This operating means is not explained in greater detail in this description.

The machining centre 1 may comprise, in particular, at least one additive unit 3 configured for forming an unmachined workpiece in the machining zone 2 by additive production. The additive unit 3 may be arranged and may be movable above the horizontal machining plane. The additive unit 3 may be, in particular, coupled with support, conveying and guide means for supporting, conveying and guiding the machining centre 1. The additive unit 3 may be, in particular, configured for performing, through control of the numerically controlled operating axes, machining movements in the direction of one or more of the operating axes (for example the linear operating axes X, Y, Z and the rotary axes) of the machining centre.

The additive unit 3 may comprise, in particular, a 3D printing unit. The additive unit 3 may comprise, in particular, at least one operating member 30 with a rotation axis. The additive unit 3 may comprise, in particular, extruder for extruding the material that is suitable for additive production. This extruder may comprise, in particular, the aforesaid operating member 30 with a rotation axis. The operating member 30 with a rotation axis may comprise, as in the specific embodiment, an extruding screw of the extruder. The additive unit 3 may be configured, in particular, for receiving the drive energy of the operating member 30 with a rotation axis from a motorized tool-holding spindle, as will be explained better further on in the description.

The machining centre 1 may comprise, in particular, at least one power take-off 4 connected to the rotation axis of the operating member 30 of the additive unit 3. The machining centre 1 may comprise, in particular, motion transmission mechanism 5 configured for connecting the power take-off 4 to the rotation axis. The power take-off 4 may comprise, in particular, an axis parallel to the rotation axis of the operating member 30.

The power take-off 4 may be, in particular, offset with respect to the rotation axis of the operating member 30. The power take-off 4 may be arranged, in particular, above the horizontal machining plane. The power take-off 4 may, in particular, face downwards (for example be orthogonal to the horizontal machining plane). The power take-off 4 may be arranged, in particular, with a vertical axis. The power take-off 4 may comprise, in particular, a suitable connection for coupling with a spindle axis of a tool-holding spindle, such as for example a tapered or similar connection.

The motion transmission mechanism 5 may comprise, in particular, a speed reducer configured for reducing a rotation speed from the power take-off 4 to the rotation axis of the operating member 30 of the additive unit 3, so that the operating member 30 can rotate at a different (in particular, lower) rotation speed with respect to the spindle axis that will be connected to the power take-off 4. The speed reducer may comprise, in particular, a gear reducer. The motion transmission mechanism 5 may comprise, in particular, at least one transmission with a closed loop transmission flexible member (for example of the belt and/or cable and/or chain type) wound on wheel means (pulleys).

The machining centre 1 may comprise, in particular, a support arrangement 6 for supporting the additive unit 3, the power take-off 4 and the motion transmission mechanism 5. The support arrangement 6 may comprise, in particular, at least one support plate arranged horizontally. The power take-off 4 may be arranged at least partially in a cavity obtained in the support plate 6. The rotating operating member 30 of the additive unit 3 may comprise an overall dimension in a vertical direction that is prevalently located (at least 50%, or at least 70%, or at least 90%) or entirely below the support plate. The motion transmission mechanism 5 may be arranged above the support plate.

The machining centre 1 may comprise, in particular, at least one subtractive unit 7 configured for removing material from the workpiece formed in the machining zone 2 by the additive unit 3. The subtractive unit 7 may comprise, in particular, at least one tool-holding spindle 70 with a motorized spindle axis 8. The subtractive unit 7 may be arranged, in particular, above the horizontal machining plane.

Figure 1:
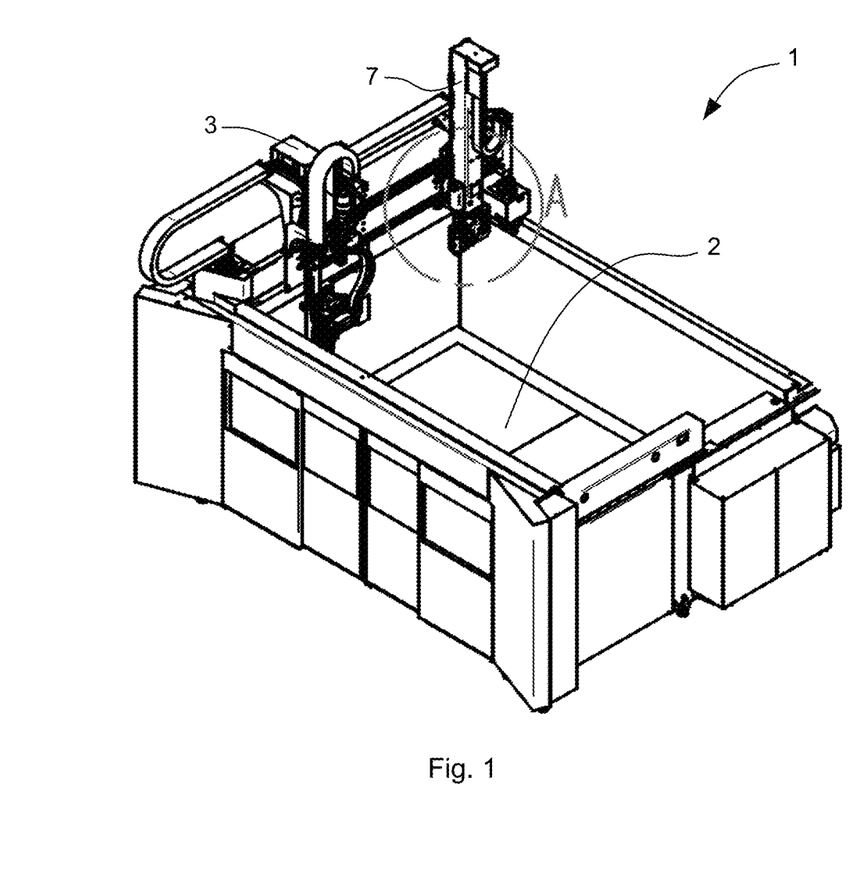
FIG. 1 is a perspective view of an embodiment of a machining centre made in accordance with the invention in a subtractive configuration.
Figure 2:
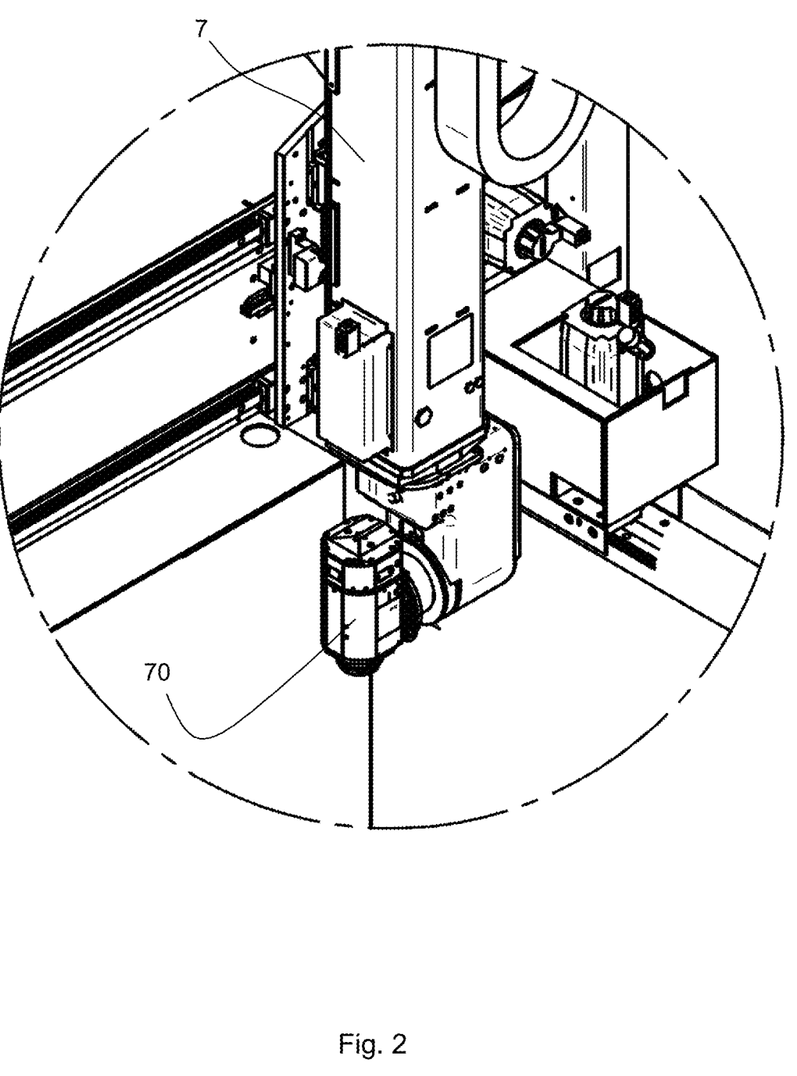
FIG. 2 shows an enlarged detail of FIG. 1.

The machining centre 1 may be configured, in particular, to adopt at least one subtractive configuration (see FIG. 1), in which the spindle axis 8 is not engaged with the power take-off 4 and is thus not connected to the rotation axis to drive the operating member 30 of the additive unit 3. In the subtractive configuration, the motorized spindle axis 8 can carry a tool for removing material.

Figure 3:
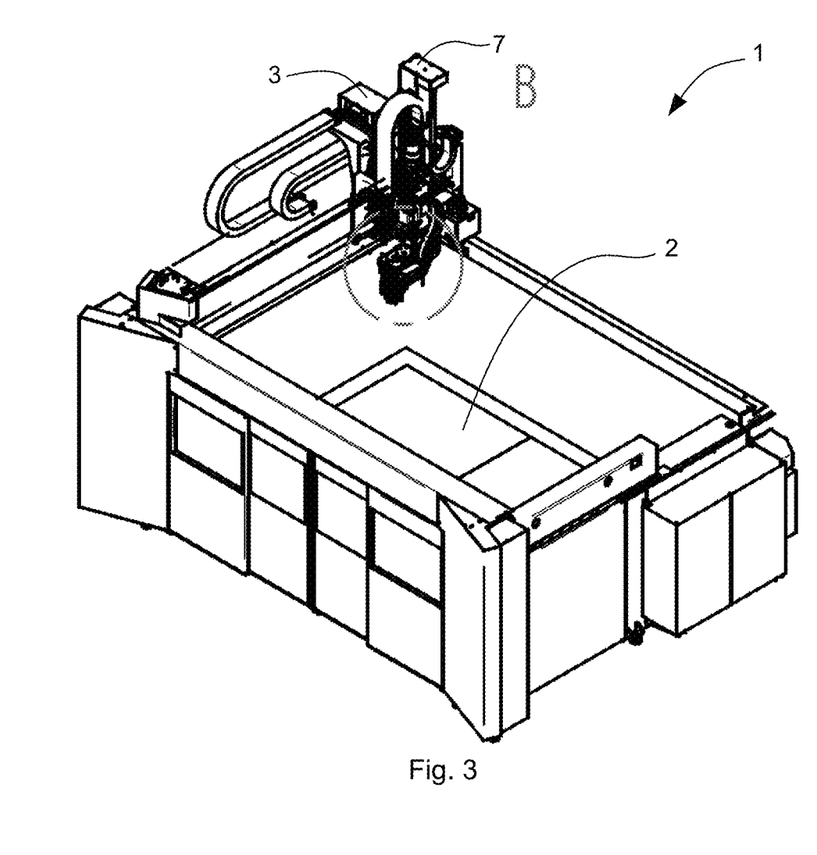
FIG. 3 shows the machining centre of FIG. 1 in an additive configuration.
Figure 4:
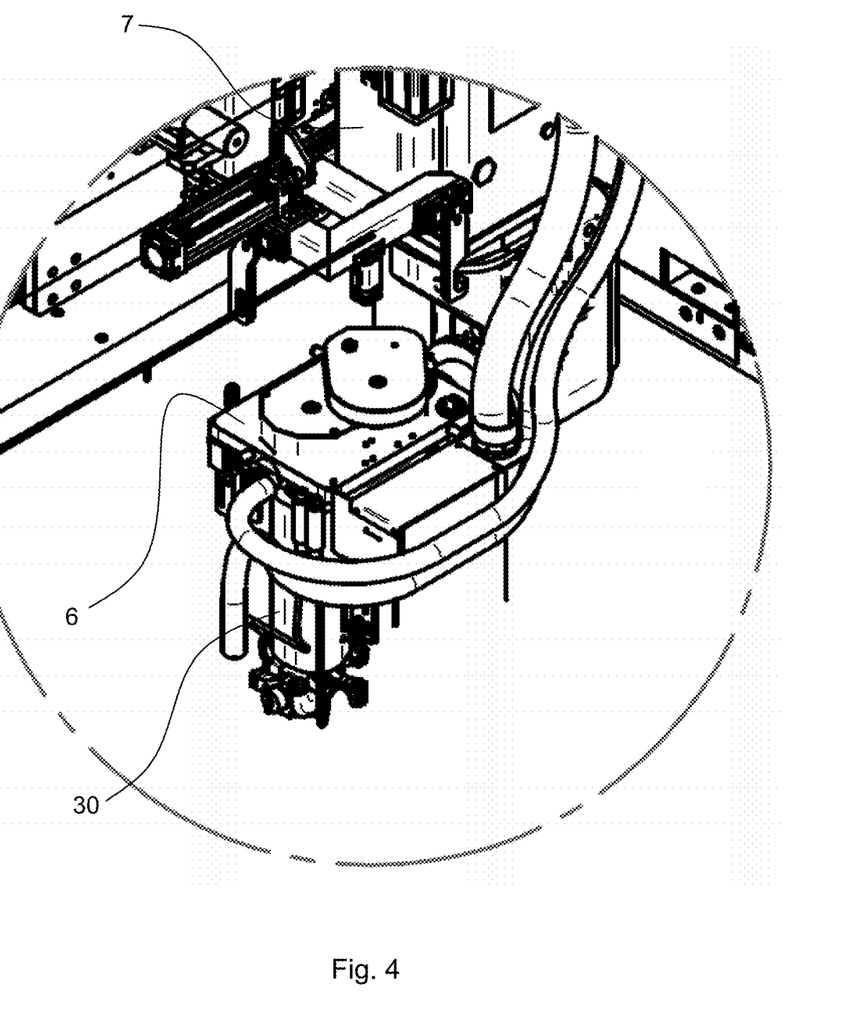
FIG. 4 shows an enlarged detail of FIG. 3.
Figure 5:
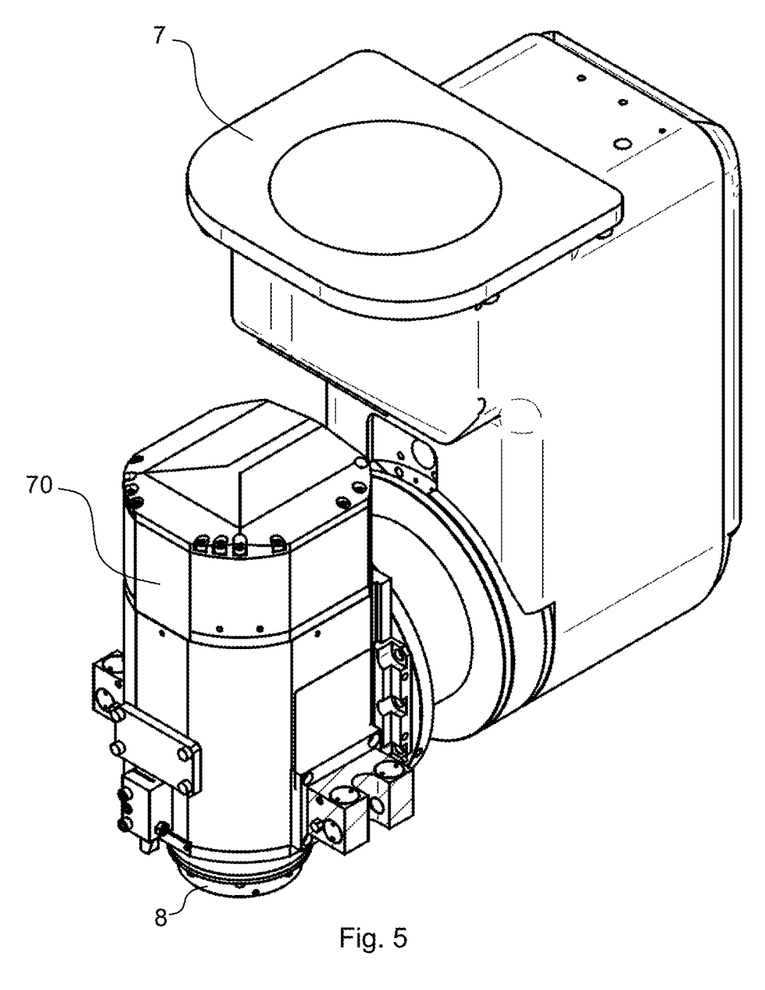
FIG. 5 is a perspective raised elevation view of the machining centre of FIG. 1, with the spindle axis facing downwards in a position that is suitable for subtractive operations.
Figure 10:
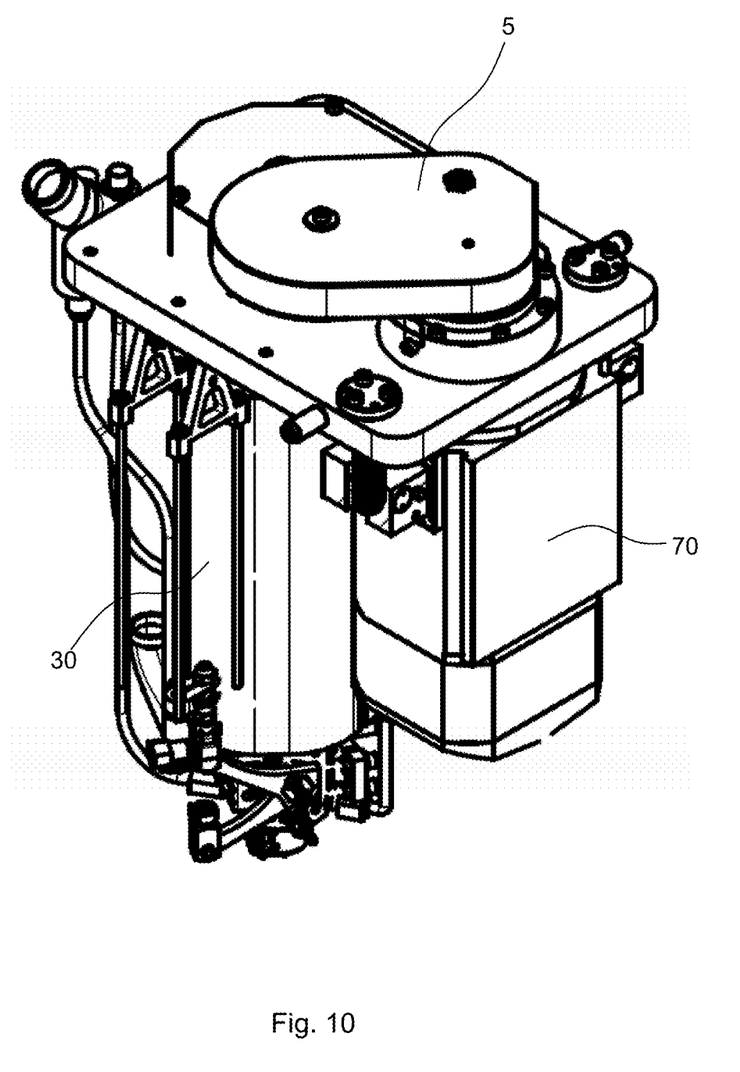
FIG. 10 is a perspective raised elevation view of the subtractive unit and of the additive unit of the preceding figures with the spindle axis coupled with the power take-off in the additive configuration.

The machining centre 1 may be configured, in particular, to adopt at least one additive configuration (see FIG. 3), in which the spindle axis 8 is removably engaged on the power take-off 4 to drive the rotation axis of the operating member 30 of the additive unit 3. In the additive configuration (see also FIG. 4 or FIG. 10), at least one part of the tool-holding spindle 70 of the subtractive unit 7 and at least one part of the operating member 30 of the additive unit 3 are situated next to one another, where "next to" means in a horizontal direction.

In particular, it is possible, in the additive configuration, for at least 50%, or 75%, or 90% of the vertical overall dimensions of the tool-holding spindle 70 to be situated next to the vertical overall dimensions of the operating member 30, where "next to" means in a horizontal direction, i.e. at the same height.

In particular, it is possible to provide, in the additive configuration, for at least 50%, or 75%, or 90% of the vertical overall dimensions of the rotating operating member 30 of the additive unit 3 being situated next to the vertical overall dimensions of the tool-holding spindle 70, where "next to" means in a horizontal direction, i.e. at the same height.

In particular, it is possible to provide, in the additive configuration, for at least 50%, or 75%, or 90% of the vertical overall dimensions of the operating member 30 of the additive unit 3 being located in a vertical position, or height, that is lower than a lower end (at the lower position) of the power take-off 4. In particular, it is possible to provide, in the additive configuration, for at least 50%, or 75%, or 90% of the vertical overall dimensions of the operating member 30 of the additive unit 3 being located in a vertical position, or height, lower than the plate of the support arrangement 6.

In particular, it is possible to provide, in the additive configuration, for the spindle axis 8 facing upwards, in the subtractive configuration, the spindle axis 8 facing downwards (for example tilted by 180°). It is possible to provide for a movement between the additive configuration and the subtractive configuration comprising a rotation of the tool-holding spindle 70 of the subtractive unit 7 around a rotation axis, in particular a horizontal rotation axis. This rotation may comprise, in particular, a rotation of 180°.

In the additive configuration, the additive unit 3 and the subtractive unit 7 may be, in particular, coupled together in a removable manner and may be movable together by at least one part of the, or all the, numerically controlled operating axes of the machining centre 1.

It is possible to provide, in particular, for at least one numerically controlled rotational axis of the machining centre 1 being able to be configured for controlling the aforesaid rotation of the subtractive unit 7 (in particular of the tool-holding spindle 70) in a movement between the subtractive configuration and the additive configuration.

Figure 6:
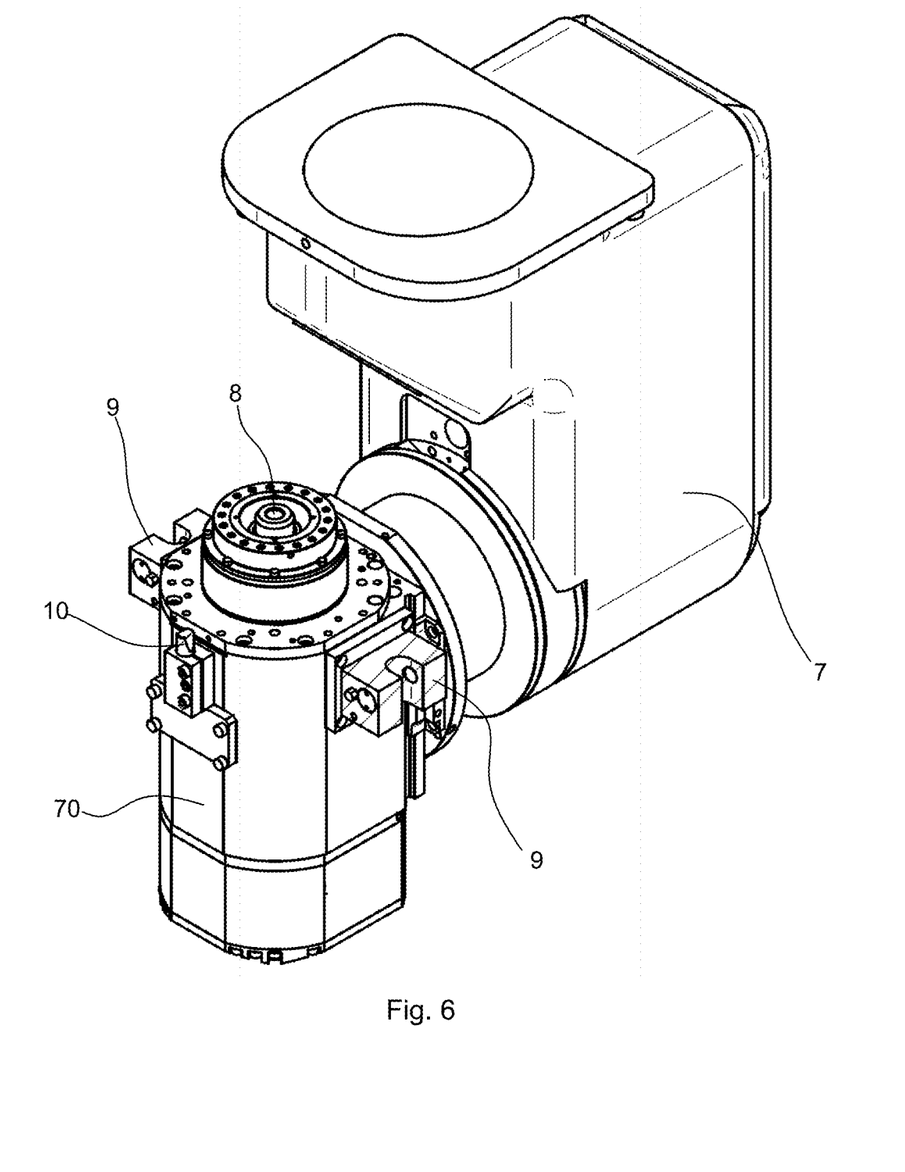
FIG. 6 shows the subtractive unit rotated with respect to FIG. 5, with the spindle axis facing upwards in a suitable position for being connected to the additive unit of the machining centre of FIG. 1.
Figure 7:
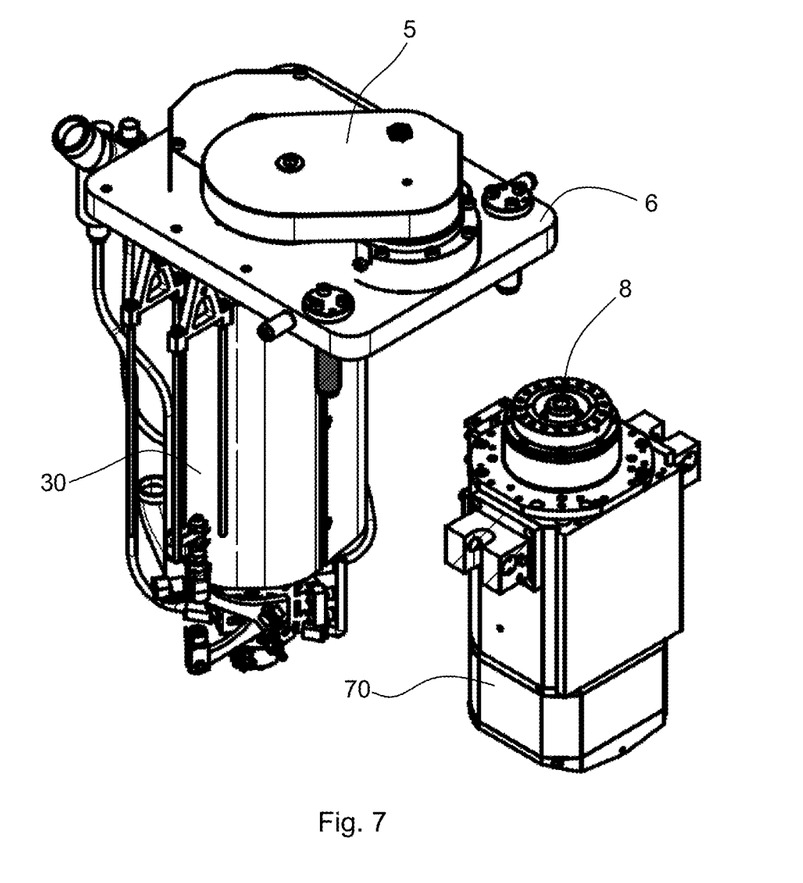
FIG. 7 shows the subtractive unit in the position of FIG. 6 located near the additive unit.
Figure 8:
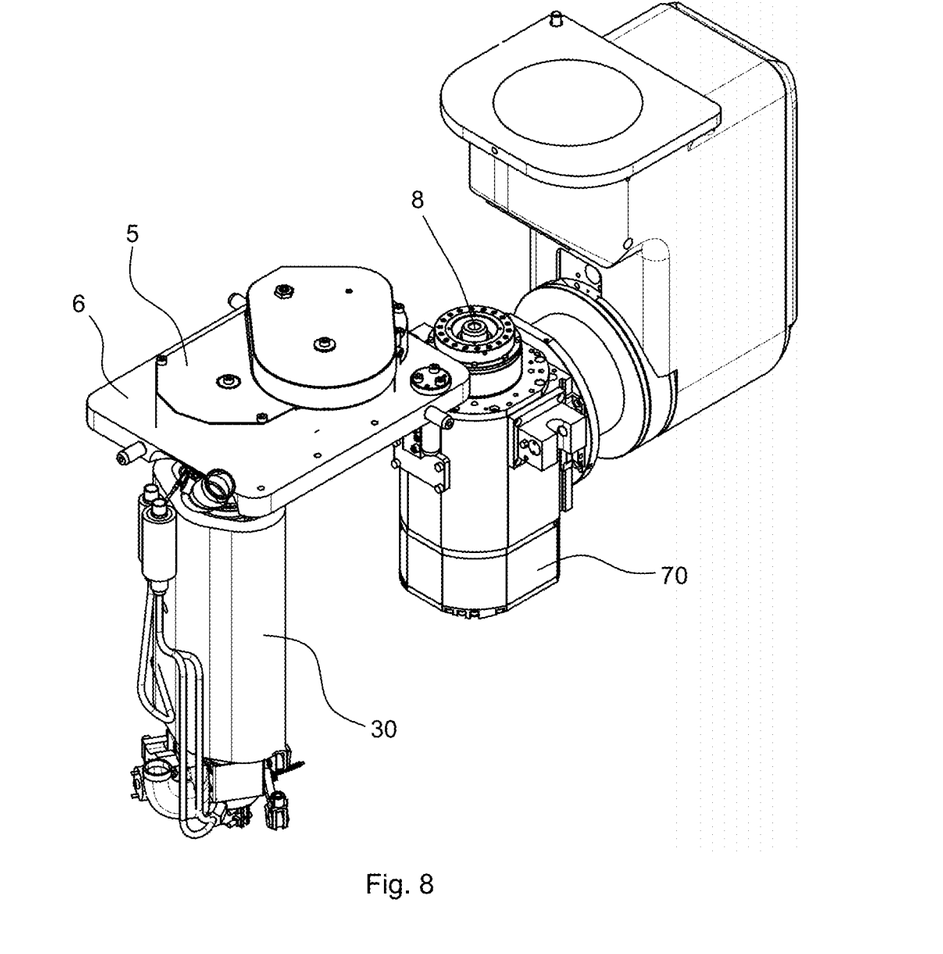
FIG. 8 is a view according to another perspective of FIG. 7.
Figure 9:
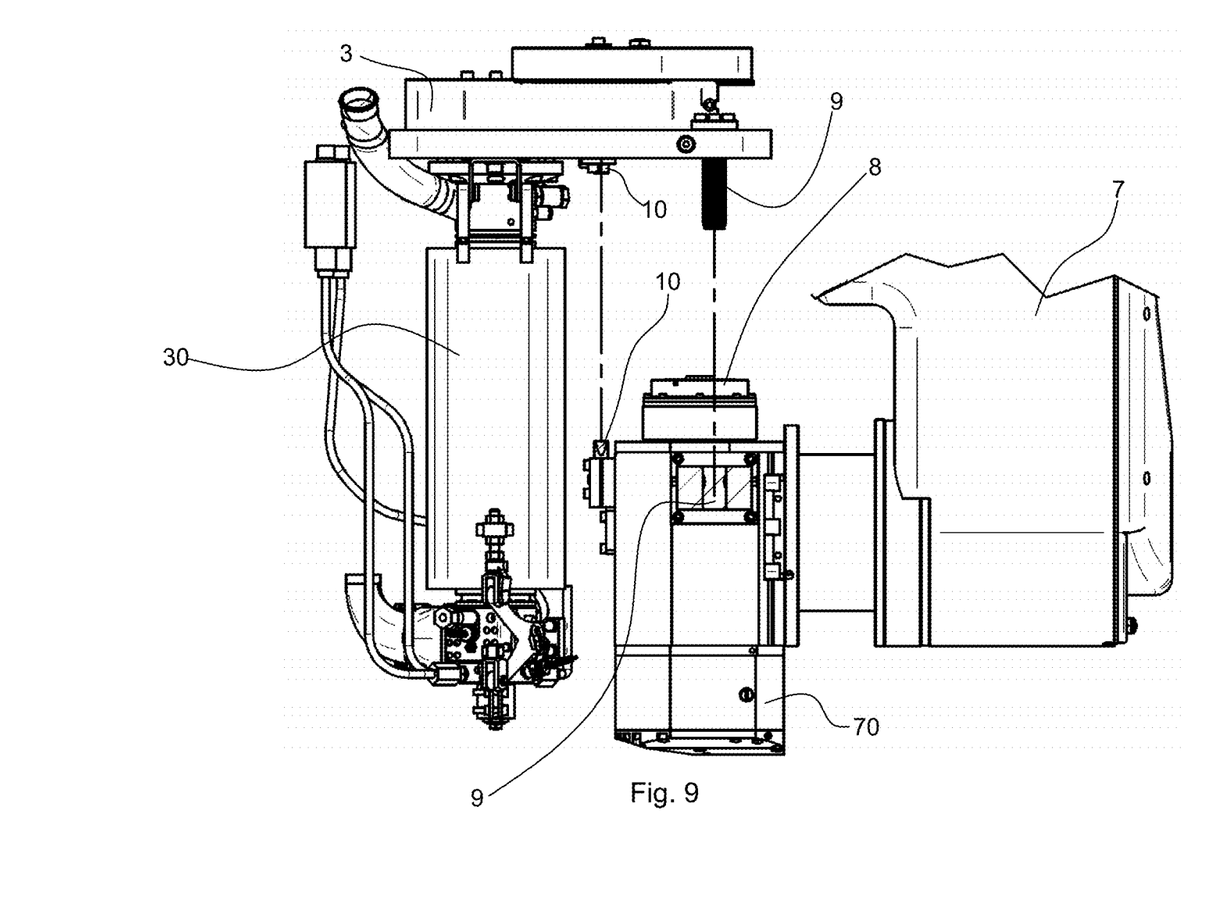
FIG. 9 is a side view in a raised elevation of the subtractive unit and of the additive unit of the machining centre of FIG. 1 with the spindle axis of the subtractive unit that is coaxial with the power take-off and is not yet coupled therewith.
Figure 11:
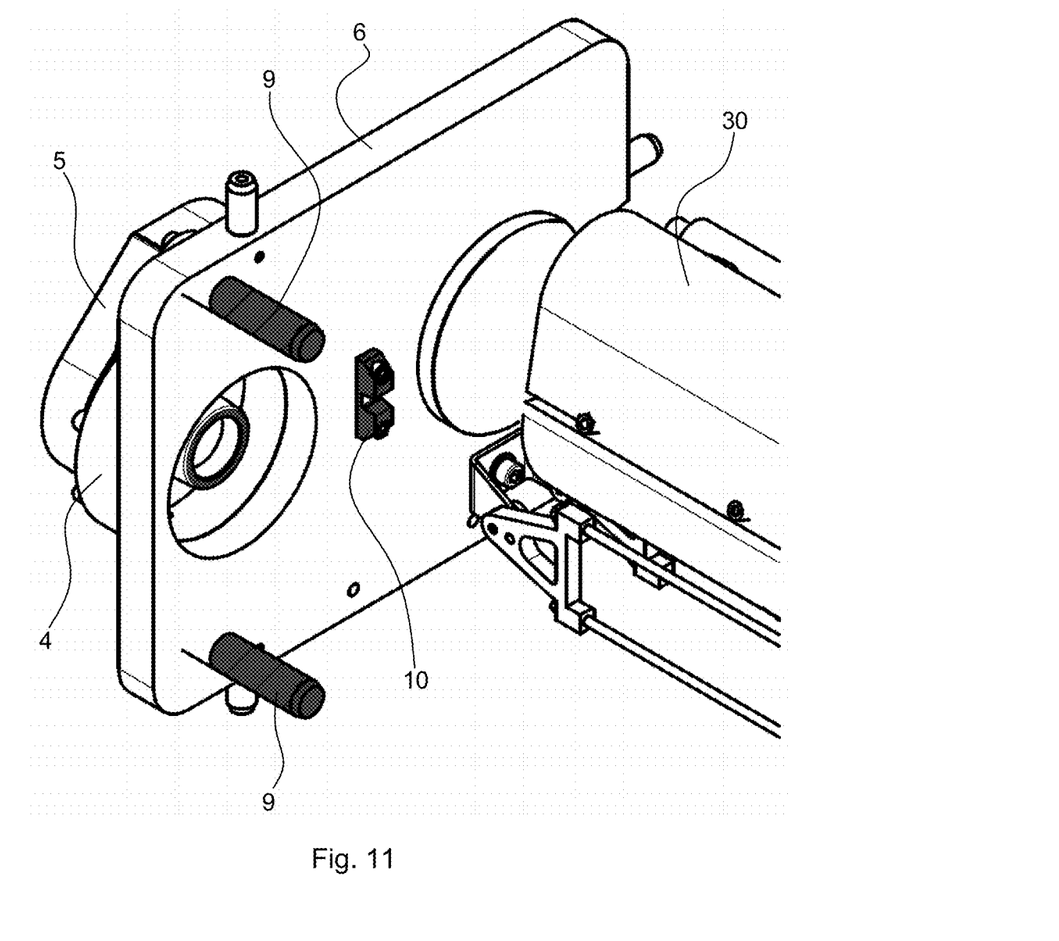
FIG. 11 is a perspective bottom view of the power take-off of the machining centre of FIG. 1.

The support arrangement 6 may comprise, in particular, anti-rotation portion 9 configured for preventing a relative rotation between the support arrangement 6 and the subtractive unit 7 in the additive configuration, in particular rotation due to the spindle axis 8 of the tool-holding spindle 70 that drives the rotation axis of the operating member 30 of the additive unit 3. In particular, it is possible to provide, in the additive configuration, for the support arrangement 6 being couplable removably with the subtractive unit 7 by the anti-rotation portion 9. The anti-rotation portion 9 may comprise, in particular, one or more pegs or pins (see FIG. 9 or FIG. 11) that are insertable and extractable in an axial direction (vertical) within corresponding recesses or slots (see FIG. 6 or FIG. 9) to prevent rotation of the support arrangement 6. The pegs or pins may, in particular, protrude downwards from the plate of the support arrangement 6. The recesses or slots may be, in particular, arranged on sides (for example on two opposite sides) of the subtractive unit 7 and be open laterally on the outside.

The support arrangement 6 may comprise, in particular, a brake for locking the additive unit 3 with respect to the subtractive unit 7 in the additive configuration. The brake may comprise locking actuators (for example with a drive by operating fluid or with an electric drive) to lock and unlock the brake upon a command.

The support arrangement 6 may comprise, in particular, a resting portion 10 (in particular in cooperation with the anti-rotation portion 9 that may also act as support arrangement) configured to discharge at least one part of the weight of the additive unit 3 on the subtractive unit 7 in such a manner that at least one part of the weight of the additive unit 3 does not weigh on the power take-off 4 when the machining centre 1 is in the additive configuration. The resting portion 10 may comprise, for example, at least one end of the tool-holding spindle 70 (see FIG. 6 or FIG. 9) protruding upwards and configured for coupling in a resting manner with a corresponding rest portion (see FIG. 9 or FIG. 11) arranged on a lower side of the support arrangement 6.

The support arrangement 6 may be, in particular, coupled removably with the subtractive unit 7 by the resting portion 10 in order not to load, at least partially, the weight of the additive unit 3 (and of the motion transmission mechanism 5) on the power take-off 4.

The operation of the numeric control machining centre 1 comprises actuating a machining method for machining by removing material of the unmachined workpieces achieved by additive production techniques.

The machining method may comprise, in particular, the step of coupling the motorized spindle axis 8 of the tool-holding spindle 70 of the subtractive unit 7 with the power take-off 4 connected to the rotation axis of the operating member 30 of the additive unit 3. The operating member 30 may comprise, as said, extruder for processing extrudable material to perform additive production. As said, the power take-off 4 may be, in particular, offset with respect to the rotation axis of the operating member 30.

The machining method may comprise, in particular, the step of forming an unmachined workpiece in the machining zone 2 with additive production by the additive unit 3 driven by the motorized tool-holding spindle 70 of the subtractive unit 7. During the forming step, the operating member 30 of the additive unit 3 may be rotated by the motorized spindle axis 8 engaged with the power take-off 4, whilst the additive unit 3, being coupled with the subtractive unit 7, may be moved by at least one part of the numerically controlled operating axes (in particular the linear axes X, Y, Z) of the machining centre 1.

After the forming step, the machining method may comprise, in particular, the step of decoupling the spindle axis 8 from the power take-off 4 (for example by extracting axially in a vertical direction the spindle axis 8 from the power take-off 4) and thus coupling the spindle axis 8 with a tool for removing material. Coupling of the tool may comprise, in particular, automatic picking-up of the tool from a tool magazine.

Before the step of decoupling, the machining method may comprise, in particular, the step of unlocking the brake to enable the subtractive unit 7 to be moved without the need to move the additive unit 3 which, in the subtractive machining step, may remain stationary.

The machining method may comprise, in particular, the step of performing a machining task to remove material by using a subtractive unit 7, removing material from the unmachined workpiece previously formed with additive production from the additive unit 3.

As said, it is possible to provide, during the aforesaid step of forming, for at least one part of the tool-holding spindle 70 and at least one part of the operating member 30 being situated next to one another, where "next to" means in a horizontal direction. In particular, during the forming step by additive production, at least 50%, or 75%, or 90% of the vertical overall dimensions of the tool-holding spindle 70, may be situated next to the operating member 30 (extruder with extruder screw). In particular, during the forming step at least 50%, or 75%, or 90% of the vertical overall dimensions of the operating member 30 may be situated next to the tool-holding spindle 70.

In the specific embodiment, in which the vertical overall dimensions of the additive unit 3 is greater than the vertical overall dimensions of the tool-holding spindle 70, the entire vertical overall dimensions of the tool-holding spindle 70 are situated next to (in the same vertical position) at least one part of the additive unit 3.

The invention claimed is:

1. A machining method, comprising the steps of:
 coupling a motorized spindle axis of a tool-holding spindle of a subtractive unit with a power take-off connected to a rotation axis of an operating member of an additive unit, said power take-off being offset with respect to said rotation axis;

forming an unmachined workpiece with an additive production by means of said additive unit driven by said subtractive unit;

decoupling said spindle axis from said power take-off and then coupling said spindle axis with a tool to remove material;

performing a process for removing material from said unmachined workpiece formed with additive production by using said subtractive unit.

2. The method according of claim 1, wherein, during said step of forming, at least a part of said tool-holding spindle and at least a part of said operating member are located beside one another, where "beside" is intended in a horizontal direction.

3. The method according to claim 2, wherein during said forming step at least 50% of the vertical size of said tool-holding spindle is located beside said operating member and/or that at least 50% of the vertical size of said operating member is located beside said tool-holding spindle.

4. A CNC machining centre, comprising:
at least one work area;
at least one additive unit configured to form an unmachined workpiece in said work area by additive production and comprising at least one operating member with a rotation axis;
at least one power take-off connected to said rotation axis by a motion transmission mechanism, said power take-off being offset with respect to said rotation axis;
at least one subtractive unit configured to perform removal of material from the workpiece formed in said work area and comprising at least one tool-holding spindle with a motorized spindle axis;
said machining centre being configured to assume at least one subtractive configuration, in which said spindle axis is not connected to said rotation axis and is able to carry a tool to remove material, and at least one additive configuration, in which said spindle axis is removably connected to said power take-off to drive said rotation axis.

5. The machining centre of claim 4, wherein, in said additive configuration, at least a part of said tool-holding spindle and at least a part of said operating member are located beside one another, where "beside" is intended in a horizontal direction.

6. The machining centre of claim 4, wherein, in said additive configuration, at least 50% of the vertical size of said tool-holding spindle is located beside the vertical size of said operating member, where "beside" is intended in a horizontal direction.

7. The machining centre of claim 4, wherein, in said additive configuration, at least 75% of the vertical size of said tool-holding spindle is located beside the vertical size of said operating member, where "beside" is intended in a horizontal direction.

8. The machining centre of claim 4, wherein, in said additive configuration, at least 50% of the vertical size of said operating member is located beside the vertical size of said tool-holding spindle, where "beside" is intended in a horizontal direction.

9. The machining centre of claim 4, wherein, in said additive configuration, at least 75% of the vertical size of said operating member is located beside the vertical size of said tool-holding spindle, where "beside" is intended in a horizontal direction.

10. The machining centre of claim 4, wherein said power take-off faces downwards and at least 50% of the vertical size of said operating member is located at a lower vertical height with respect to a lower end of said power take-off, said spindle axis being turned upwardly in said additive configuration.

11. The machining centre of claim 4, wherein said spindle axis faces downwards in said subtractive configuration and faces upwards in said additive configuration.

12. The machining centre of claim 4, comprising at least two numerically controlled operating axes, at least one of which being a vertical linear axis, said subtractive unit being movable by said two operative axes, wherein in said additive configuration, said additive unit and said subtractive unit are removably coupled together and are movable together by said two operative axes.

13. The machining centre of claim 4, wherein a movement between said additive configuration and said subtractive configuration comprises a rotation of said subtractive unit about a second rotation axis.

14. The machining centre of claim 13, wherein said rotation of said subtractive unit is about a horizontal rotation axis.

15. The machining centre of claim 4, comprising at least three numerically controlled operating axes, at least two of which being linear axes and at least one of which being a rotary axis, said subtractive unit being movable by means of said three operating axes, said rotary axis being configured to control a rotation of said subtractive unit in a movement between said subtractive configuration and said additive configuration.

16. The machining centre of claim 4, wherein said additive unit comprises an extruder for extruding material suitable for additive production, said extruder comprising said operating member with said rotation axis.

17. The machining centre of claim 4, wherein said motion transmission mechanism is configured to vary a rotation speed from said power take-off to said rotation axis.

18. The machining centre of claim 4, comprising a support arrangement for supporting said additive unit and/or said power take-off and/or said motion transmission mechanism, wherein in said additive configuration, said support arrangement is removably coupled with said subtractive unit by an anti-rotation portion configured to prevent a relative rotation between said support arrangement and said subtractive unit.

19. The machining centre of claim 18, wherein said anti-rotation portion is configured to prevent said relative rotation between said support arrangement and said subtractive unit due to the spindle axis which drives said rotation axis.

20. The machining centre of claim 4, comprising a support arrangement for supporting said additive unit and/or said power take-off and/or said motion transmission mechanism, wherein in said additive configuration, said support arrangement is removably coupled with said subtractive unit by a resting portion configured to discharge at least a part of the weight of said additive unit so that said at least a part of the weight of said additive unit is not weighing on said power take-off.

* * * * *